US008770591B2

(12) United States Patent
Sasaki et al.

(10) Patent No.: US 8,770,591 B2
(45) Date of Patent: Jul. 8, 2014

(54) CONNECTOR SEAL

(75) Inventors: Yasuhiro Sasaki, Shizuoka (JP); Shigeru Tanaka, Shizuoka (JP); Osamu Sugiyama, Shizuoka (JP); Tohru Kurosawa, Shizuoka (JP); Hiroaki Yamagishi, Shizuoka (JP); Genki Murakoshi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 298 days.

(21) Appl. No.: 12/382,102

(22) Filed: Mar. 9, 2009

(65) Prior Publication Data

US 2009/0250885 A1 Oct. 8, 2009

(30) Foreign Application Priority Data

Apr. 3, 2008 (JP) ................................ 2008-097419
Aug. 22, 2008 (JP) ................................ 2008-213723

(51) Int. Cl.
*F16L 17/06* (2006.01)
*H02G 15/04* (2006.01)
*F16L 5/02* (2006.01)

(52) U.S. Cl.
USPC ............ 277/609; 277/607; 277/608; 277/917

(58) Field of Classification Search
USPC ................. 277/607, 603, 606, 608, 609, 917; 174/50
See application file for complete search history.

(56) References Cited

U.S. PATENT DOCUMENTS 4,414,427 A * 11/1983 Slater et al. .................... 174/661
5,112,241 A * 5/1992 Chesnut et al. ............... 439/273
5,429,697 A * 7/1995 Lilienthal et al. ........ 156/244.19
5,538,441 A * 7/1996 Paolucci et al. ............... 439/589
5,954,345 A * 9/1999 Svoboda et al. .............. 277/626
6,174,200 B1 * 1/2001 Bigotto et al. ................ 439/587
6,443,457 B1 * 9/2002 Daoud .......................... 277/314

(Continued)

FOREIGN PATENT DOCUMENTS

CN 101663799 A 3/2010
FR 2844645 3/2004

(Continued)

OTHER PUBLICATIONS

Notification of the First Office Action for Chinese Patent Application 200910133045.5 dated Jan. 19, 2011.
Notification of the Second Office Action for Chinese Patent Application 200910133045.5 dated Oct. 19, 2011 (with English translation).

*Primary Examiner* — Vishal Patel
*Assistant Examiner* — Nicholas L Foster
(74) *Attorney, Agent, or Firm* — Edwards Wildman Palmer LLP; James E. Armstrong, IV; Stephen D. LeBarron

(57) ABSTRACT

The present invention is to provide a connector seal allowing an accurate inspection of presence of an incorrectly formed bore in a terminal insertion bore of the connector seal. A connector seal includes a seal main body and a plurality of terminal insertion bores. Each terminal insertion bore has an upper membrane potion and a lower membrane portion, which are spaced one another and interconnected together with a lamella. Preferably, the terminal insertion bore has a membrane, which includes a substantially curved groove and a substantially curved lamella. Preferably, the terminal insertion bore has a membrane which includes a lamella, the lamella being oriented in a direction coincident with a diagonal line of a rectangular cross-section of a terminal so that corners of the terminal hit opposite ends of the lamella.

2 Claims, 12 Drawing Sheets

(56) References Cited

U.S. PATENT DOCUMENTS

| | | | | |
|---|---|---|---|---|
| 7,121,557 | B2 * | 10/2006 | Christie et al. | 277/606 |
| 7,527,366 | B2 * | 5/2009 | Jones | 347/85 |
| 7,744,411 | B2 * | 6/2010 | Casses et al. | 439/587 |
| 7,854,628 | B2 * | 12/2010 | Chazottes et al. | 439/587 |
| 2002/0084596 | A1 * | 7/2002 | Michele et al. | 277/609 |
| 2008/0277370 | A1 * | 11/2008 | Mikkelsen | 215/247 |
| 2010/0059941 | A1 * | 3/2010 | Beele | 277/606 |

FOREIGN PATENT DOCUMENTS

| | | | | |
|---|---|---|---|---|
| FR | 2844645 | A1 * | 3/2004 | H01R 13/52 |
| WO | WO 2008/107740 | * | 9/2008 | H01R 13/52 |
| WO | WO-2008/107740 | A1 | 9/2008 | |

* cited by examiner

CONNECTOR SEAL

BACKGROUND OF THE INVENTION

1. Field of the Invention

The present invention relates to a connector seal having a membrane to be broken with insertion of a terminal.

2. Description of the Related Art

FIGS. 16A and 16B show a conventional connector seal (FR 2844645-A1, FIG. 2).

The conventional connector seal 61 is made of a rubber and has a mat shape to be attached to a connector housing (not shown). The connector seal 61 has a plurality of terminal insertion bores 62 in a seal main body (not shown) Each terminal insertion bore 62 integrally has a membrane 63. The membrane 63 has a step portion 64 on each surface thereof and a lamella 65 interconnecting the step portions 64. As a terminal 66 is inserted into the terminal insertion bore 62, breaks the membrane 63, and further inserted, an outer surface of an electrical wire connected to the terminal 66 is sealed with a lip 67 disposed inside of the insertion bore 62.

A connector includes a connector housing, the terminal 66, and the connector seal. Some of the terminal-receiving chambers do not receive the terminals. It is thus necessary to close the terminal insertion bores 62 with the membranes 63 when the terminals are not inserted in the terminal insertion bores 62. Closure of the terminal insertion bores 62 is intended to prevent entry of water or dust into the connector. A reference sign m of FIG. 16A indicates the central line of the terminal insertion bore 62.

When the terminal 66 is incorrectly inserted into and removed from the terminal insertion bore 62 by a worker, a bore 68 is usually formed in the membrane 63 due to insertion of the terminal 66 and allows entry of water into the connector. It is thus necessary to inspect presence of the bore 68 in the membrane 63 with a test pin or an air-leak test. However, when the membrane 63 is subjected to a compression force in a radial direction thereof from an adjacent terminal insertion bore 62 due to insertion of the electrical wire, the bore 68 tends to be closed. The test pin or the air-leak test thus fails to inspect the presence of the bore 68, causing entry of the water into the connector during use.

SUMMARY OF THE INVENTION

An object of the present invention is to provide a connector seal affecting an accurate inspection of presence of a bore in a membrane of an unused terminal insertion bore of the connector seal when an electrical wire is inserted in an adjacent terminal insertion bore. The present invention also provides the connector seal having the easily breakable membrane.

According to a first aspect of the present invention, a connector seal includes a seal main body; and a plurality of terminal insertion bores disposed on the seal main body, wherein the terminal insertion bores each include a membrane therein, the membrane having an upper membrane portion and a lower membrane portion spaced a distance along an insertion direction of a terminal, the upper and the lower membrane portion being interconnected with a lamella at an associated step portion of the respective membrane portions.

Thereby, when the terminal is incorrectly inserted into and removed from the terminal insertion bore, a bore is formed between the upper and the lower membrane portion. When an electrical wire connected to the terminal is inserted in an adjacent terminal insertion bore, the membrane portions are subjected to a compression force in a radial direction thereof and forms a cavity in the bore so that a presence of the bore can be assuredly detected with an inspection.

According to a second aspect of the present invention, a connector seal includes a seal main body; and a plurality of terminal insertion bores disposed on the seal main body, wherein the terminal insertion bores each include a membrane, the membrane having a substantially curved groove and a substantially curved lamella disposed at the groove.

Thereby, when a terminal is incorrectly inserted into and removed from the terminal insertion bore, a curved bore is formed in the curved lamella. When an electrical wire connected to the terminal is inserted in an adjacent terminal insertion bore, the membrane is subjected to a compression force in a radial direction thereof and forms a cavity in a direction perpendicular to the direction of the compression force.

Preferably, the curved groove is substantially S-shaped.

Thereby, when a terminal is incorrectly inserted and removed from the terminal insertion bore, a substantially S-shaped bore is formed in the curved lamella. When an electrical wire connected to the terminal is inserted into an adjacent terminal insertion bore, the S-shaped bore is subjected to a compression force in a radial direction thereof and forms a cavity at both end portions or a central portion of the S-shaped bore in accordance with a direction of the compression force.

Preferably, the curved groove is circular-shaped and disposed along an inner surface of the terminal insertion bore.

Thereby, when a terminal is inserted into the terminal insertion bore, the membrane breaks at the groove (lamella) and further around a circumference thereof. It is preferable that corners of a rectangular cross-section of the terminal hit and break the groove. When the terminal is incorrectly inserted into and removed from the terminal insertion bore, a circular bore including the lamella is formed. When an electrical wire connected to the terminal is inserted into an adjacent terminal insertion bore, the membrane is subjected to a compression force in a radial direction thereof and forms a cavity in the lamella in a direction perpendicular to a direction of the compression force.

Preferably, the circular groove has a center angle of at least 90 degrees for accepting insertion of the terminal having a rectangular cross-section.

Thereby, when the terminal having a square cross-section is inserted into the terminal insertion bore, corners of the terminal assuredly hit the groove (lamella) and further break the membrane. The center angle of at least 90 degrees of the groove is adapted for insertion of the terminal having the rectangular cross-section. When the terminal has the square cross-section, it is preferable that the center angle is at least 90 degrees in order that the adjacent corners abut the groove at the same time.

Preferably, the lamella is oriented in a direction of a diagonal line of a rectangular cross-section of the terminal so that corners of the terminal hit opposite ends of the lamella.

Thereby, when the terminal is incorrectly inserted into and removed from the terminal insertion bore, a bore extending a whole length of the lamella is formed so that a presence of the bore can be assuredly detected with an inspection.

The lamella is assuredly broken so that the terminal is smoothly inserted into the terminal insertion bore.

According to a third aspect of the present invention, a connector seal includes a seal main body; and a plurality of terminal insertion bores disposed on the seal main body, wherein the terminal insertion bores each include a membrane, the membrane having a groove and a lamella disposed at the groove, when the membrane is subjected to a compression force in a radial direction of the terminal insertion bore, the membrane being capable of releasing the compression force in order to prevent closure of a bore formed in the membrane.

Thereby, when electrical wires connected to terminals each are inserted into the associated adjacent terminal insertion bore, the groove of the incorrectly-inserted terminal insertion bore absorbs the compression force exerted on the membrane and prevents closure of the bore. It is apparent that the lamella of the membrane assists breaking of the membrane when the terminal is correctly inserted.

DETAILED DESCRIPTION OF THE PREFERRED EMBODIMENTS

Figure 1A:
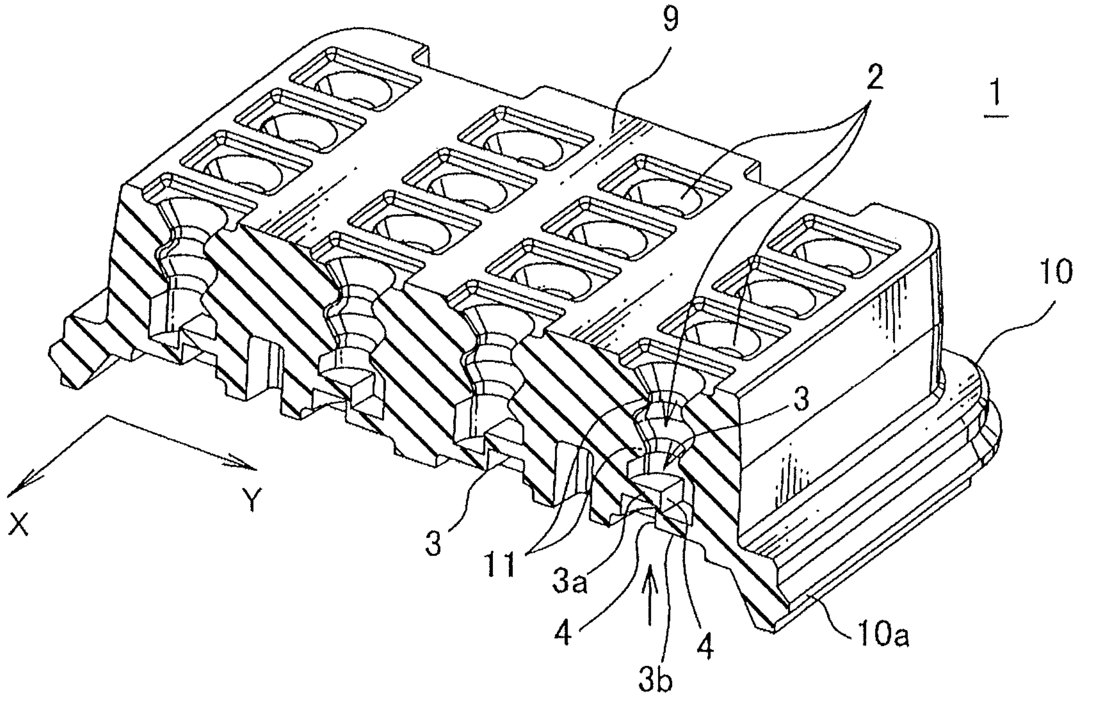
FIG. 1A is a perspective view, partly cross-sectional, of a first embodiment of a connector seal of the present invention.

FIGS. 1-4 show a first embodiment of a connector seal of the present invention.

Referring to FIGS. 1A-2B, the connector seal 1 is made of a (resilient) synthetic rubber and has a plurality of terminal insertion bores 2.

The terminal insertion bores 2 each have a membrane 3, which includes an upper membrane portion 3*a* and a lower membrane portion 3*b*. The upper and the lower membrane portion 3*a*, 3*b* are spaced along a longitudinal direction of the terminal insertion bore 2 and interconnected at step portions 4 with a lamella 5.

Figure 3A:
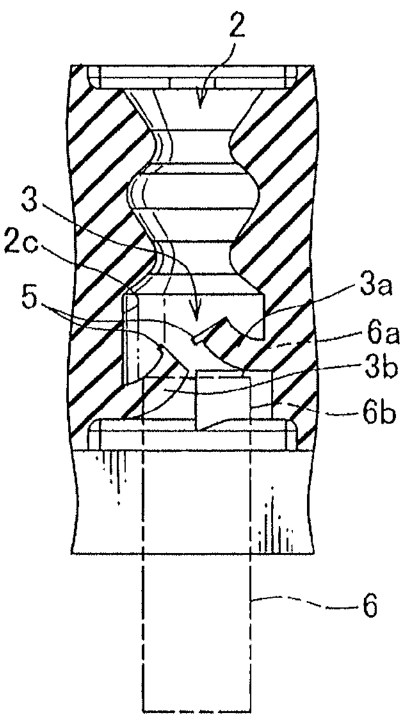
FIG. 3A is a vertical cross-sectional view showing when a membrane is broken.
Figure 3B:
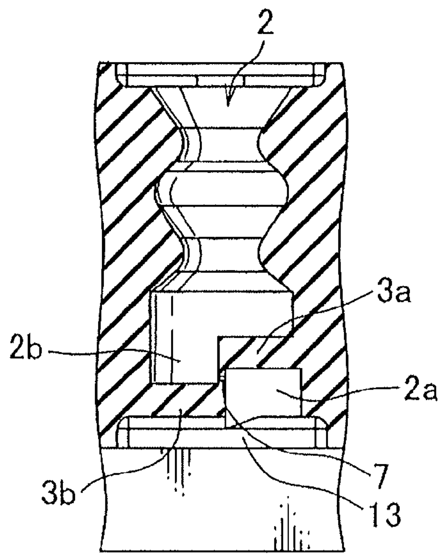
FIG. 3B is a vertical cross-sectional view showing the membrane positioned on an initial position.

Referring to FIGS. 3A and 3B, when a terminal 6 is incorrectly inserted into and removed from the terminal insertion bore 2, the vertical lamella 5 of the membrane 3 is broken and a bore 7 is formed in a radial or horizontal direction of the terminal insertion bore 2. A chamber 2*a* under the upper membrane 3*a* and a chamber 2*b* over the lower membrane 3*b* are then communicated one another through the bore 7.

Figure 4:
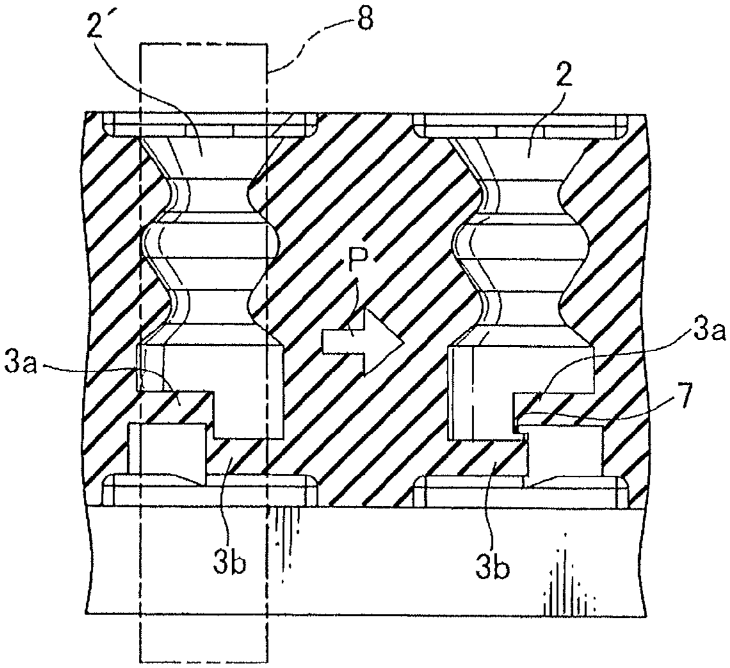
FIG. 4 is a vertical cross-sectional view showing that an incorrectly-inserted terminal insertion bore is subjected to a compression force from an adjacent terminal insertion bore receiving an electrical wire connected to a terminal.

Referring to FIG. 4, when an electrical wire 8 connected with the terminal 6 is inserted into the terminal insertion bore 2' adjacent to the incorrectly-inserted terminal insertion bore 2, the incorrectly-inserted terminal insertion bore 2 is subjected to a compression force P in the radial direction thereof. The lower membrane portion 3*b* of the incorrectly-inserted terminal insertion bore 2 is horizontally displaced with respect to the upper membrane portion 3*a* while the bore 7 is remained (the bore 7 rather grows in size). A test pin or air-leak test thus assuredly detects a presence of the bore 7.

Referring to FIG. 1A, the connector seal 1 includes a seal main body 9 with a plate shape and a flange portion 10, which is disposed on a lower end of the seal main body 9 and outwardly projects from the lower end. The flange portion 10 has a lip 10*a* around itself. The seal main body 9 includes a plurality of the terminal insertion bores 2 arranged in X-Y direction with equally spaced distances, respectively. The terminal insertion bores 2 in the X direction are more adjacent to one another compared to the Y direction.

The connector seal 1 is attached to a skirt portion of a connector housing (not shown) so as to make the lip 10*a* contact an inner surface of the connector housing. Each terminal 6 connected with the electrical wire 8 is then inserted into an associated terminal receiving chamber through the relevant terminal insertion bore 2 and the electrical wire 8 then contacts a small diameter lip 11 disposed on the inner surface of the terminal insertion bore 2.

The connector seal 1 of the present invention includes two of the lips 11 disposed above the membrane 3. Directions such as upper, lower, front, rear, right, and left are only used for explanation of the description and do not correspond with a direction of an assembly of the connector.

Figure 1B:
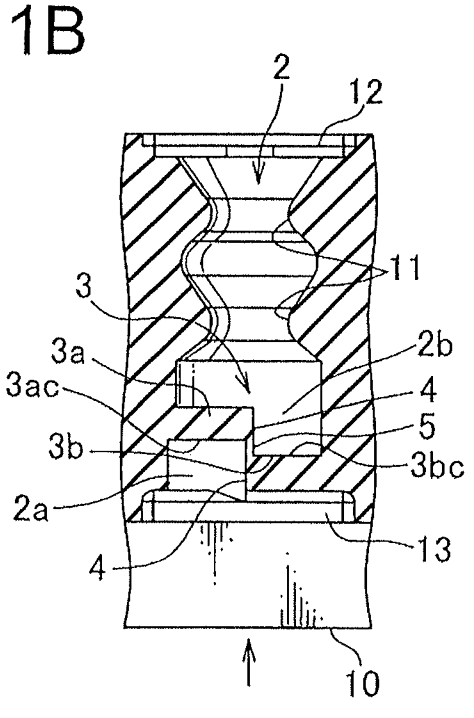
FIG. 1B is a cross-sectional view of an essential portion of the first embodiment.
Figure 2A:
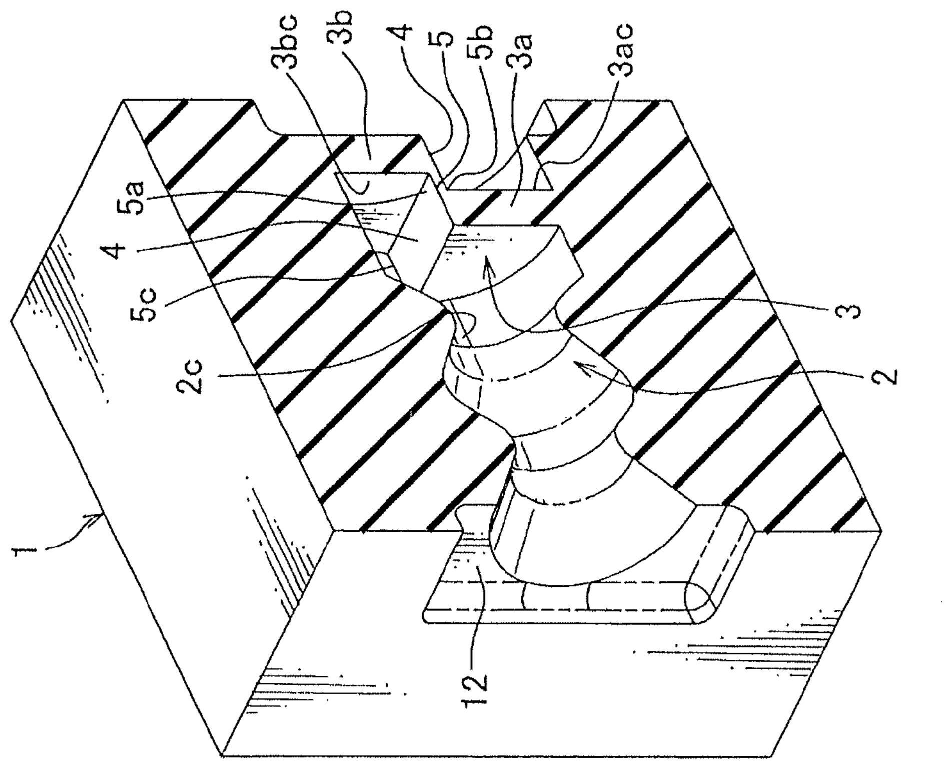
FIG. 2A is a perspective view of the essential portion when viewed from a front side.
Figure 2B:
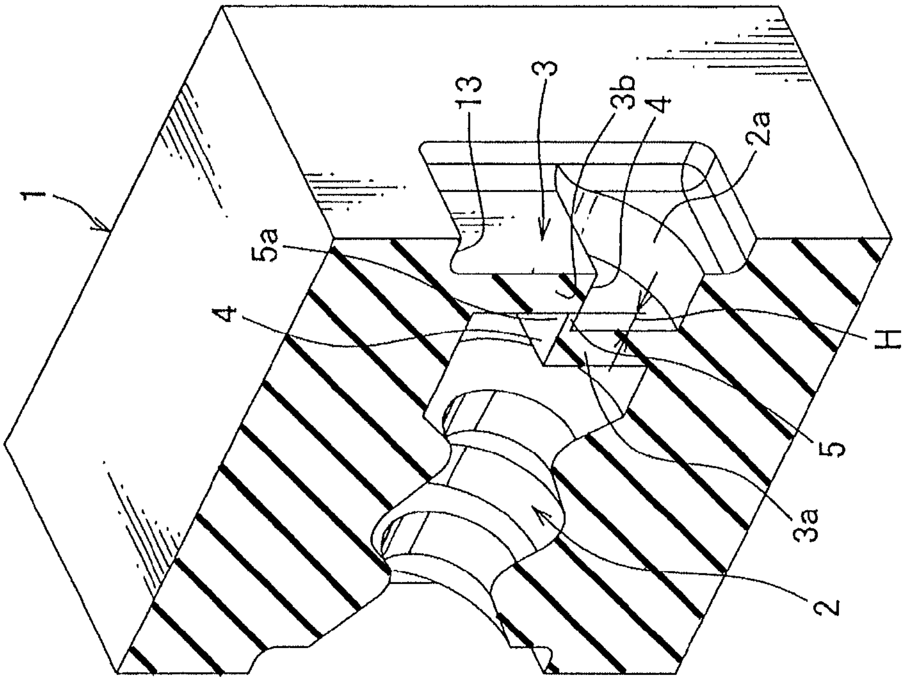
FIG. 2B is a perspective view of the essential portion when viewed from a rear side.

Referring to FIGS. 1B, 2A and 2B, the terminal insertion bore 2 has a circular cross-section and a rectangular-shaped opening 12, 13 at each surface of the connector seal 1. The membrane 3 has the upper membrane portion 3*a* and the lower membrane portion 3*b* interconnected with the lamella 5 at the respective step portions 4. A lower surface of the lower membrane portion 3*b* is flush with the lower opening 13 and an upper surface 3*bc* thereof has a semi-circular shape. A lower surface 3*ac* of the upper membrane portion 3*a* has a semi-circular shape and communicates the lower opening 13 through the chamber 2*a*, and an upper surface thereof has a semi-circular shape.

Referring to FIGS. 2A and 2B, the upper and the lower membrane portion 3*a*, 3*b* are interconnected at the center of the terminal insertion bore 2 with the lamella 5 which extends along the longitudinal direction of the terminal insertion bore 2. The upper and the lower membrane portion 3*a* and 3*b* are spaced one another in an insertion direction of the terminal 6 by a distance (height) H. The lower surface 3*ac* of the upper membrane portion 3*a* is parallel to and positioned above the upper surface 3*bc* of the lower membrane portion 3*b* by the distance H. The lamella 5 is upstanding in a gap between the upper and the lower membrane portion 3*a* and 3*b*, and interconnects both membrane portions 3*a* and 3*b*.

The height H of the lamella 5 is substantially equal to or larger than a thickness of the lamella 5. It is necessary to have the height of the lamella 5 in order that the lamella 5 forms the bore 7 when the electrical wire 8 is inserted in the adjacent terminal insertion bore 2' and the compression force P is applied to the upper and the lower membrane portion 3*a* and 3*b*.

The lamella 5 is integral with the lower surface of the semicircular upper membrane portion 3*a* and the upper surface of the semicircular lower membrane portion 3*b*. An end surface of the semicircular upper membrane portion 3*a* and an end surface of the semicircular lower membrane portion 3*b* are flush with an inner surface 5*a* and an outer surface 5*b* of the lamella 5, respectively. Both ends 5*c* of the lamella 5 are connected to an inner surface 2*c* of the terminal insertion bore 2.

The lamella 5 is easily mold-formed with a pair of dies each having a vertically projecting portion.

After the lamella 5 is broken, the bore 7 is formed between the upper and the lower membrane portion 3*a*, 3*b* in the radial (horizontal) direction with respect to the insertion direction of the terminal 6 (FIG. 3B).

As the terminal 6 is inserted into the terminal insertion bore 2, the terminal 6 breaks the lamella 5 with a distal end 6*a*, the membrane portions 3*a*, 3*b* are forwardly opened up, and the membrane portions 3*a*, 3*b* are finally positioned between an outer surface 6*b* of the terminal 6 and the inner surface 2*c* of the terminal insertion bore 2.

When the terminal 6 is incorrectly inserted into and removed from the terminal insertion bore 2, the upper and the lower membrane portion 3*a*, 3*b* resiliently resume the initial positions. When returned to the initial positions, the bore 7 is horizontally formed in the lamella 5 (FIG. 3B) and the terminal insertion bore 2 is thus communicated outside through the bore 7. When the electrical wire 8 connected to the terminal 6 is inserted in an adjacent terminal insertion bore 2' as shown in FIG. 4, the incorrectly-inserted terminal insertion bore 2 keeps the bore 7 under the compression force P from the adjacent insertion bore 2' so that the detector can assuredly detect the presence of the bore 7.

It is appreciated that the membrane 3 can be disposed in any position in the terminal insertion bore 7. When the test pin is utilized for inspection of the bore 7, it is preferable to dispose the membrane 3 close to a front surface in order to use a short stroke pin.

The openings 12, 13 are formed only for a purpose of rubber mold forming and may be omitted. The openings 12, 13 may have a circle shape or be eliminated when the terminal insertion bores 2 having a diameter larger than that of FIG. 1 (two kinds of the terminal insertion bores 2) are formed. The connector seal 1 has generally a length and a width of 2-3 cm.

The lamella 5 of the present invention has the flat shape along the radial direction thereof. It is appreciated that the lamella 5 can have a curved-shape.

FIGS. 5-9 show a second embodiment of the connector seal of the present invention.

Figure 5A:
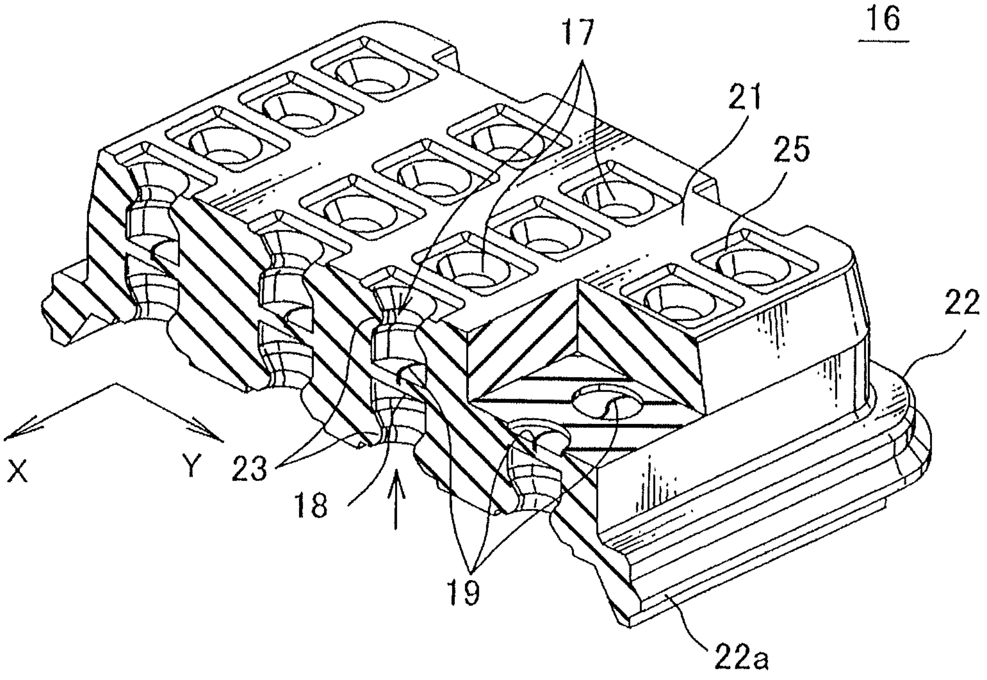
FIG. 5A is a perspective view, partly cross-sectional, of a second embodiment of the connector seal of the present invention.
Figure 5B:
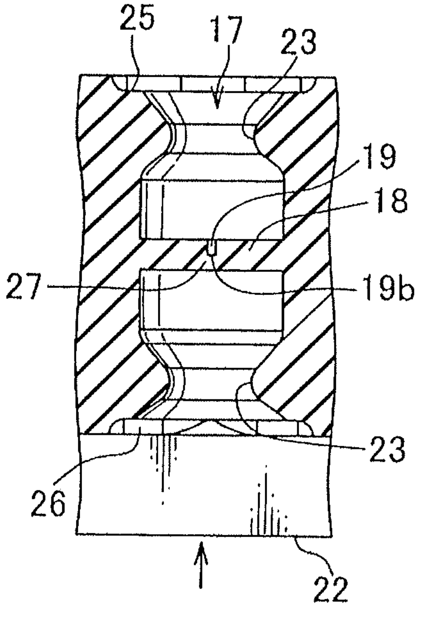
FIG. 5B is a vertical cross-sectional view of an essential portion of the second embodiment.
Figure 5C:
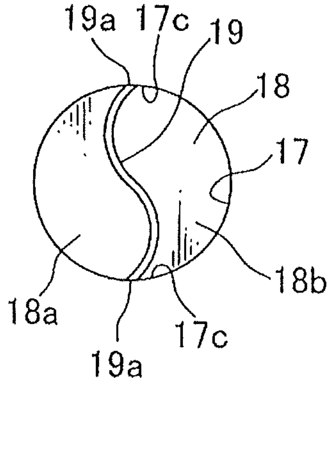
FIG. 5C is a plan view of the essential portion of the second embodiment.

Referring to FIGS. 5A-5C, a connector seal 16 is made of a resilient synthetic rubber and has a plurality of terminal insertion bores 17. Each terminal insertion bore 17 includes a flat membrane 18 extending in a radial direction (horizontal direction) thereof, and the flat membrane 18 has a substantially S-shaped groove 19 at about a middle portion and on an upper surface thereof.

Figure 6:
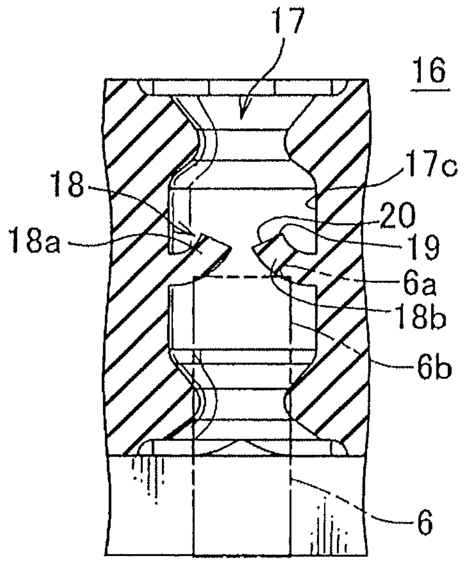
FIG. 6 is a vertical cross-sectional view showing that a terminal breaks a membrane of the connector seal.

Referring to FIG. 6, as the terminal 6 is inserted into the terminal insertion bore 17, the flat membrane 18 breaks from the S-shaped groove 19. When the terminal 6 is removed from the terminal insertion bore 17, an S-shaped bore 20 (with a plan view of FIG. 7) is formed and communicates between an insertion chamber 17*a* and an insertion chamber 17*b* over and under the membrane 18, respectively.

When the electrical wire 8 connected to the terminal 6 is inserted in the terminal insertion bore 17' adjacent to the incorrectly-inserted terminal insertion bore 17 and compresses the incorrectly-inserted terminal insertion bore 17 in the radial direction, the bore 20 forms cavities 20*a*-20*c* in a direction perpendicular to the compression direction. The membrane 18 keeps the bore 20, a width of which may be smaller than a width of the groove 19, and the presence of the bore 20 is assuredly detected by the test pin or the air-leak test.

Referring to FIG. 5A, the connector seal 16 includes a plate-shaped seal main body 21, a flange portion 22 disposed on a lower end portion of the seal main body 21, and a plurality of the terminal insertion bores 17 equally-spaced in X and Y direction. The terminal insertion bores 17 in the X direction are more densely disposed compared to the Y direction. The flange portion 22 has a lip 22*a* at an outer surface thereof.

The connector seal 16 is attached to a skirt of a connector housing (not shown) and the lip 22*a* contacts an inner surface of the connector housing. Each terminal 6 connected to the electrical wire 8 is inserted into an associated terminal receiving chamber of the connector housing and the electrical wire 8 then contacts a lip 23 disposed on the inner surface of the terminal insertion bore 17.

The lips 23 are disposed adjacent to both surfaces of the seal main body 21 and the membrane 18 is disposed on the center of the terminal insertion bore 17 in the insertion direction of the terminal 6. Orientation of the respective portions is not related to a direction of assembly of the connector.

Referring to FIGS. 5B and 5C, each terminal insertion bore 17 has a circular cross-section and openings 25, 26 disposed on a rear and a front surface thereof. The membrane 18 has a uniform thickness in the radial direction of the terminal insertion bore 17, and the upper surface and a lower surface thereof are parallel to one another.

The S-shaped groove 19 is formed in a middle portion of the upper surface of the membrane 18, and end portions 19*a* of the S-shaped groove 19 are connected to inner surfaces 17*c* of the terminal insertion bore 17. A bottom surface 19*b* of the groove 19 and the lower surface of the membrane 18 defines a lamella 27 which has a thickness about half of the thickness of the membrane 18.

The S-shaped groove 19 is mold-formed with a pair of molding dies, an upper die of which has an S-shaped projection.

When the S-shaped lamella 27 is broken with insertion of the terminal 6, the S-shaped bore 20 is formed in the horizontal direction between a right and a left membrane portion 18*a* and 18*b*.

Referring to FIG. 6, the terminal 6 is inserted into the terminal insertion bore 17 and breaks the S-shaped groove with the distal end 6*a*. With a further advancement of the terminal 6, the right and the left membrane portion 18*a* and 18*b* are folded up between the outer surface 6*b* of the terminal 6 and the inner surface 17*c* of the terminal insertion bore 17.

Figure 7:
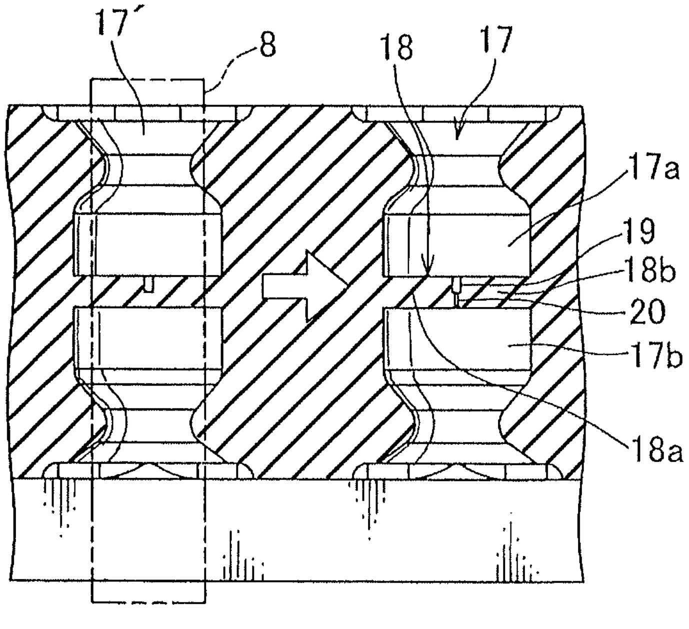
FIG. 7 is a vertical cross-sectional view showing that an incorrectly-inserted terminal insertion bore is subjected to a compression force from an adjacent terminal insertion bore receiving an electrical wire connected to the terminal.
Figure 8A:
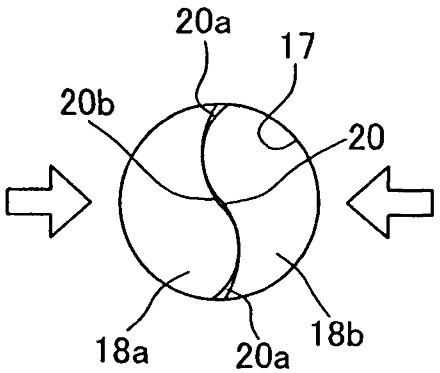
FIG. 8A is a plan view showing the broken membrane is subjected to a compression force.
Figure 8B:
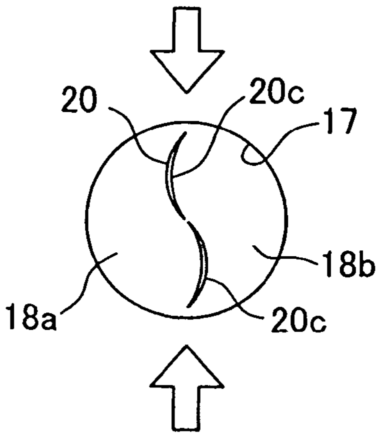
FIG. 8B is a plan view showing the broken membrane is subjected to a compression force.

Referring to FIG. 7, when the terminal 6 is incorrectly inserted into and removed from the terminal insertion bore 17, the right and the left membrane portion 18*a* and 18*b* resiliently return to the initial positions and forms the S-shaped bore 20 therebetween. When the electrical wire 8 connected to the terminal 6 is inserted in the adjacent terminal insertion bore 17' as shown in FIG. 7, the S-shaped bore 20 is compressed. As shown in FIG. 8A, when the compression force is applied in a direction perpendicular to the S-shaped bore 20, the middle portion 20*b* and the end portions 20*a* of the bore 20 are opened up and form the cavities. As shown in FIG. 8B, when the compression force is applied in a longitudinal direction of the S-shaped bore 20, the circular portions 20*c* between the middle portion 20*b* and the end portions 20*a* of the bore 20 are opened up and form the cavities. The presence of the bore 20 is thus assuredly detected.

Figure 9A:
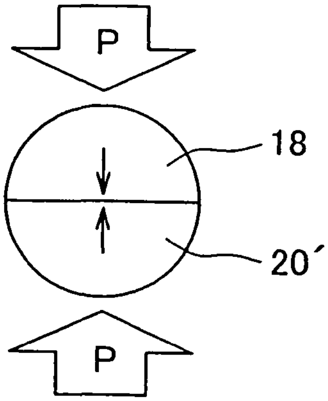
FIG. 9A is a plan view showing a principle that the broken membrane forms a cavity under the compression force.
Figure 9B:
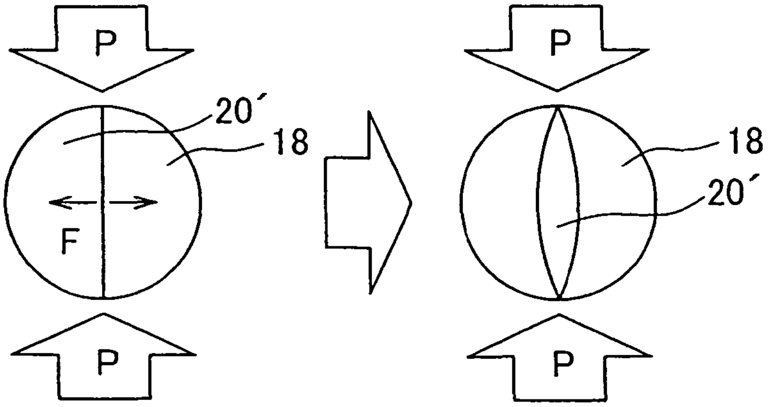
FIG. 9B is a plan view showing a principle that the broken membrane forms a cavity under the compression force.

FIGS. 9A-9B explain a principle of formation of the cavities 20*a*-20*c* in the bore 20. When the compression force P is applied in a direction perpendicular to a linear bore 20', the bore 20' is closed. However, when the compression force P is applied in the longitudinal direction of the bore 20', the bore 20' is opened up.

The bore 20 is thus opened up with a force F, depicted in FIG. 9B, by a portion partly positioned in a direction parallel to the direction of the compression force P. Accordingly, the compression force P exerting on the S-shaped bore 20 always opens up a part of the bore 20.

It is appreciated that the membrane 18 can be disposed on any position of the terminal insertion bore 17.

The openings 25, 26 are formed only for a purpose of rubber mold forming and may be omitted. The openings 12, 13 may have a circle shape or be eliminated when the terminal insertion bores 17 having a diameter larger than that of FIG. 5 (two kinds of the terminal insertion bores 2) are formed. The connector seal 16 has generally a length and a width of 2-3 cm.

It is appreciated that the groove 19 can be disposed on a lower surface of the membrane 18 and the depth thereof (thickness of the lamella 27) is suitably designed for smooth breaking with insertion of the terminal.

It is appreciated that the groove 19 can be a Z-shape, M-shape, L-shape, or circular shape as well as the S-shape. The above shapes include a linear portion and a curved portion. It is understood that a substantially curved shape includes all shapes described above. The bending or curved groove 19 forms the cavity when the electrical wire 8 is inserted into the adjacent terminal insertion bore 17'. The S-shaped groove is thus preferable.

FIGS. 10-11 show a third embodiment of the connector seal of the present invention.

Figure 10A:
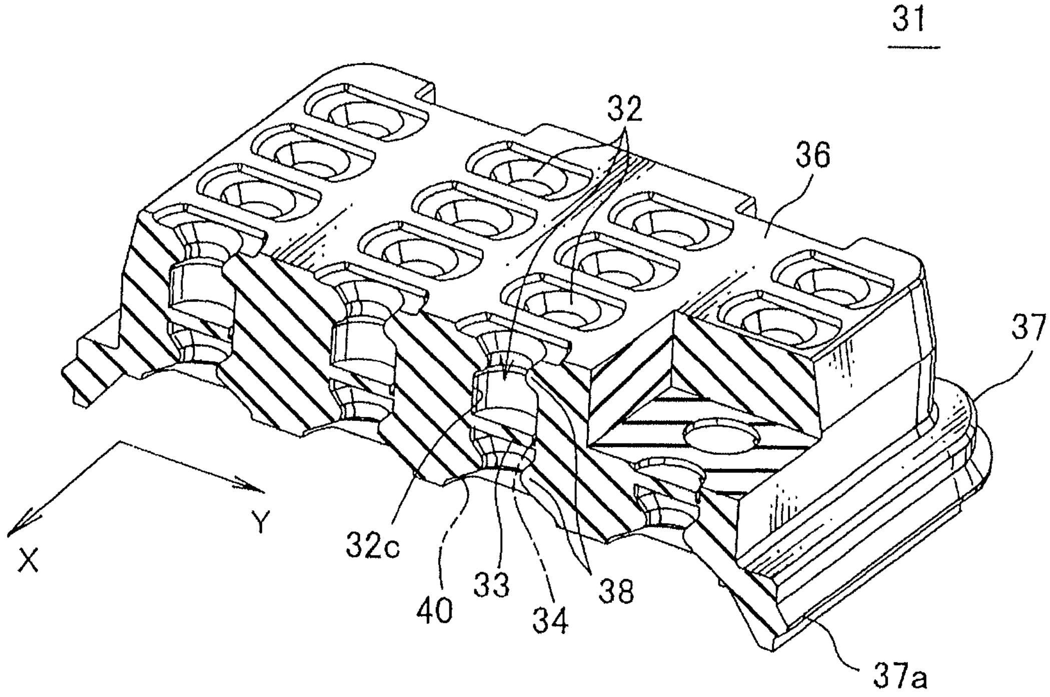
FIG. 10A is a perspective view, partly cross-sectional, of a third embodiment of the connector seal of the present invention.
Figure 10B:
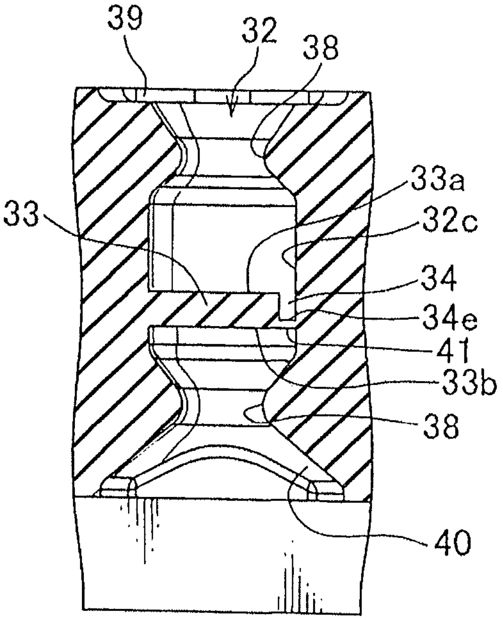
FIG. 10B is a cross-sectional view of an essential portion of the third embodiment.
Figure 10C:
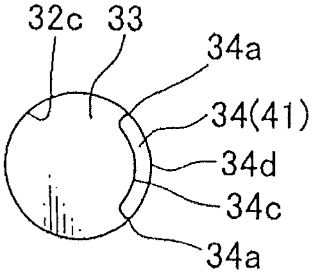
FIG. 10C is a plan view of the essential portion of the third embodiment.

Referring to FIGS. 10A-10C, a connector seal 31 is made of a resilient synthetic rubber and has a mat shape. The connector seal 31 has a plurality of terminal insertion bores 32. Each terminal insertion bore 32 has a flat membrane 33 in a radial direction thereof. The membrane 33 has a circular or curved groove 34 at an end portion of an upper surface 33*a* thereof along an inner surface 32*c* of the terminal insertion bore 32.

Figure 11A:
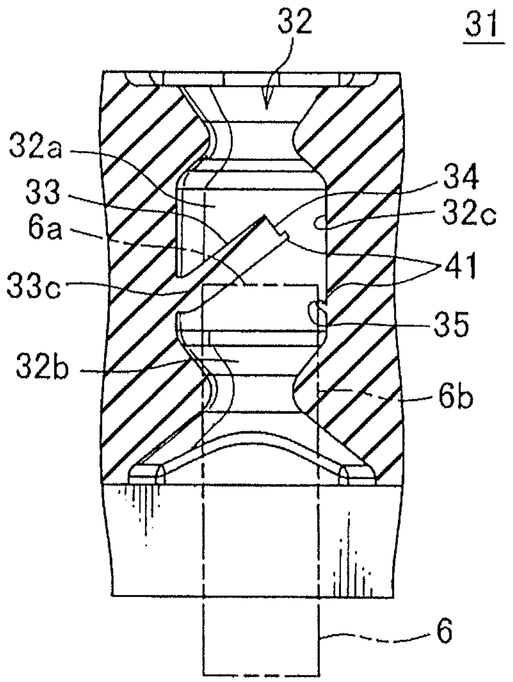
FIG. 11A is a vertical cross-sectional view showing that a membrane is broken.
Figure 11B:
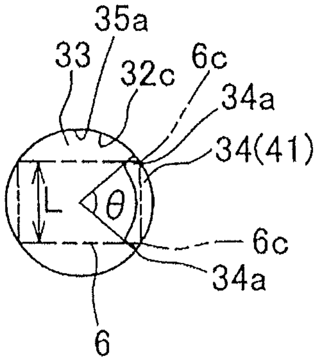
FIG. 11B is a plan view showing the membrane is broken.

Referring to FIGS. 11A-11B, as the terminal 6 is inserted into the terminal insertion bore 32, the terminal 6 firstly breaks the circular groove 34 of the membrane 33 and then breaks the membrane 33 along the inner surface 32*c* of the terminal insertion bore 32. The broken membrane 33 is connected to the inner surface 32*c* of the terminal insertion bore 32 with a base portion 33*c* opposite to the circular groove 34. A circular bore 35 is then formed and is communicated with an upper insertion chamber 32*a* and a lower insertion chamber 32*b* of the terminal insertion bore 32.

When the electrical wire 8 connected to the terminal 6 is inserted in the terminal insertion bore 32 adjacent to the incorrectly-inserted terminal insertion bore 32, the incorrectly-inserted terminal insertion bore 32 is subjected to a compression force in a radial direction thereof (see FIG. 7 of the second embodiment). The compression force forms a cavity in the bore 35 at the groove 34 or a portion shifted by 90 degrees from the groove 34. Accordingly, the test pin or the air-leak test (not shown) assuredly detects the presence of the bore 35.

Referring to FIG. 10A, the connector seal 31 includes a plate-shaped seal main body 36, a flange portion 37 disposed on a lower end portion of the seal main body 36, and a plurality of the terminal insertion bores 32 equally-spaced in X and Y direction. The terminal insertion bores 32 in the X direction are more densely disposed compared to the Y direction. The flange portion 37 has a lip 37*a* at an outer surface thereof.

The connector seal 31 is attached to a skirt of a connector housing (not shown) and the lip 37*a* contacts an inner surface of the connector housing. Each terminal 6 connected to the electrical wire 8 is inserted into an associated terminal receiving chamber of the connector housing and the electrical wire 8 then contacts a lip 38 disposed on the inner surface of the terminal insertion bore 32.

The lips 38 are disposed adjacent to both surfaces of the seal main body 36 and the membrane 33 is disposed on the center of the terminal insertion bore 32 in the insertion direction of the terminal. 6. The directions described in the specification are only defined for explanation and are not related to the direction of assembly of the connector.

Referring to FIGS. 10B-10C, each terminal insertion bore 32 has a circular cross-section and openings 39, 40 disposed on a rear and a front surface thereof. The lower opening 40 is tapered toward the front surface of the seal main body 36. The membrane 33 has a-uniform thickness in the radial direction of the terminal insertion bore 32, and the upper surface 33*a* and a lower surface 33*b* thereof are parallel to one another.

The groove 34 disposed at the end portion of the upper surface 33*a* of the membrane 33 extends along the outer circumference of the membrane 33 about a center angle (opening angle) θ of about 90 degrees. The groove 34 is defined by ends 34*a* of the longitudinal direction thereof, an inner circumference surface 34*c*, and an outer circumference surface 34*d*. The ends 34*a* and the inner circumference surface 34*c* are integral with the membrane 33 and the outer circumference surface 34*d* is integral with the inner surface 32*c* of the terminal insertion bore 32. A bottom surface 34*e* of the groove 34 and the lower surface 33*b* of the membrane 33 define a lamella 41. The thickness of the lamella 41 is about a third of the thickness of the membrane 33.

The length of the circular groove 34 is designed in order that corners 6*c* in the horizontal cross-section of the terminal 6 (FIG. 11B) abut the ends 34*a*. As an example, a line connecting between the ends 34*a* of the groove 34 is longer than a length L of a side of the terminal 6. When the terminal 6 has a square cross-section, it is preferable that the center angle θ of the circular groove 34 is at least 90 degrees.

At least one of the corners 6*c* hits the groove 34, as long as the center angle θ is 90 degrees. As the terminal 6 is inserted into the terminal insertion bore 32, the portion broken with the corner 6*c* triggers further opening of the bore along the inner surface 32*c* of the membrane 33.

The circular lamella 41 prevents clearance between the insertion bore 32 and the terminal 6 with a short length. The breaking at the end 34*a* promotes breaking of the membrane 33.

The membrane 33 and the lamella 41 are mold-formed with an upper die and a lower die with the upper die having a circular-shaped projection.

Referring to FIG. 11A, as the terminal 6 is inserted into the terminal insertion bore 32, the membrane 33 is firstly broken at the lamella 41 with the distal end 6*a* of the terminal 6 and is folded up and positioned between the outer surface 6*b* of the terminal 6 and the inner surface 32*c* of the terminal insertion bore 32.

When the terminal 6 is incorrectly inserted into and removed from the terminal insertion bore 32, the circular membrane 33 resiliently returns the initial position and the circular bore 35 is formed. As shown in FIG. 8A of the second embodiment, when the bore 35 is subjected to the compression force of the Y direction, the bore 35 forms the cavities at both of ends 35*a* in the X direction. As shown in FIG. 8B of the second embodiment, when the bore 35 is subjected to the compression force of the X direction, the bore 35 forms the cavity at the middle portion of the groove 34 in the Y direction.

The bore 35 of the third embodiment forms the cavity larger than the cavities 20*a*-20*c* of the second embodiment, so that the detection of the bore is more assuredly achieved. The center angle of the circular groove 34 can be extended to 180 degrees so that the lamella 41 can be broken with a relatively small force by mean of the corners 6*c*, which are adjacent to one another, of the terminal 6.

It is appreciated that the membrane 33 can be disposed on the lower or upper portion of the insertion bore 32 as well as the middle portion.

The openings 39, 40 are formed only for a purpose of rubber mold forming and may be omitted. The openings 39, 40 may have a circle shape or be eliminated when the terminal insertion bores 32 having a diameter larger than that of FIG. 10 (two kinds of the terminal insertion bores 2) are formed. The connector seal 31 has generally a length and a width of 2-3 cm.

It is appreciated that the groove 34 can be disposed on a lower surface of the membrane 34 and the depth thereof (thickness of the lamella 41) is suitably designed for smooth breaking with insertion of the terminal.

It is appreciated that the terminal 6 can have a circular cross-section as well as the rectangular cross-section for the first-third embodiment.

It is appreciated that each configuration of the embodiments can be adapted to the connector seal itself and also an assembly thereof. The connector seal 1, 16, 31 is attached to a rear opening of the connector housing (not shown) for a female terminal, and the female terminal connected to the electrical wire is inserted into the connector housing through the terminal insertion bore 2, 17, 32 of the connector seal 1, 16, 31. The connector seal 1, 16, 31 is attached to a bottom portion of a connector fitting chamber of the connector housing (not shown) for a male terminal, and the male terminal is inserted into the connector fitting chamber through the terminal insertion bore 2, 17, 32.

Figure 12A:
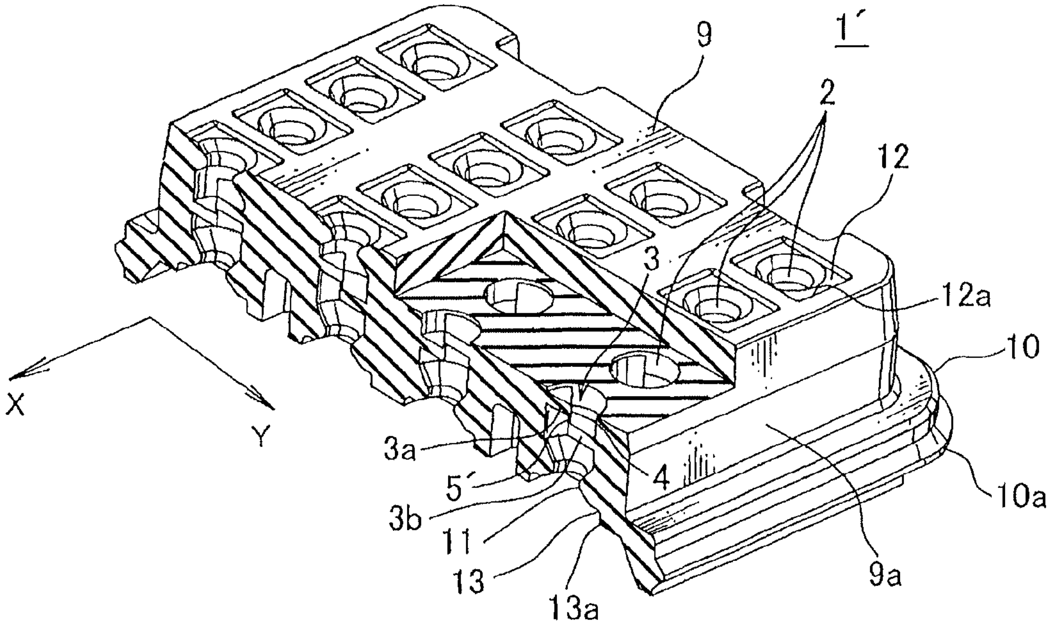
FIG. 12A is a perspective view, partly cross-sectional, of a fourth embodiment of the connector seal of the present invention.
Figure 12B:
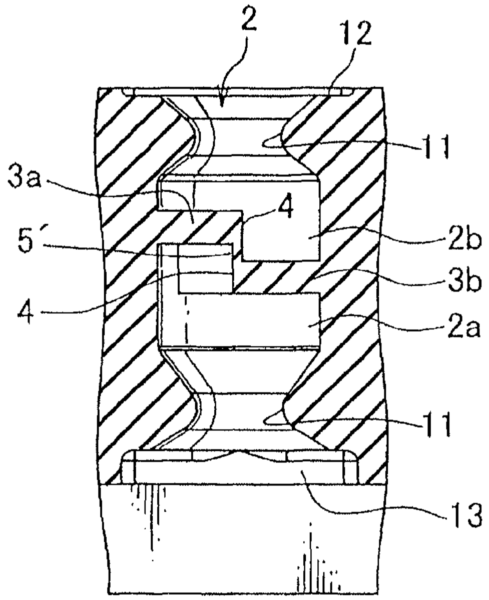
FIG. 12B is a vertical cross-sectional view of an essential portion of the fourth embodiment.
Figure 12C:
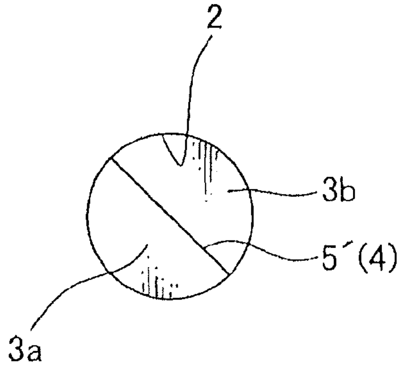
FIG. 12C is a plan view of the essential portion of the fourth embodiment.

FIGS. 12-13 show a fourth embodiment of the connector seal of the present invention. The fourth embodiment is similar to the first embodiment and like parts have the same reference signs as the first embodiment.

Referring to FIG. 12A, a connector seal 1' has a seal main body 9 and a plurality of terminal insertion bores 2. The terminal insertion bores 2 each have an upper membrane portion 3*a* and a lower membrane portion 3*b* vertically interconnected together with a lamella 5'. As shown in FIGS. 12A-13B, the lamella 5' is formed to be positioned on a diagonal line 42 of a rectangular cross-section of the terminal 6.

Figure 13A:
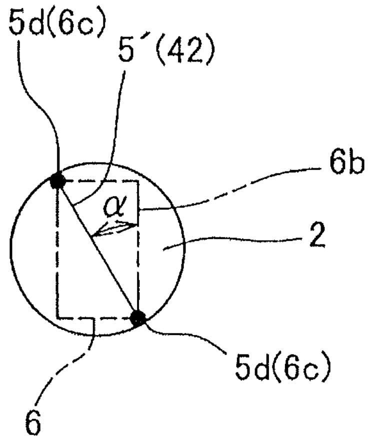
FIG. 13A is a plan view showing that a membrane is broken.
Figure 13B:
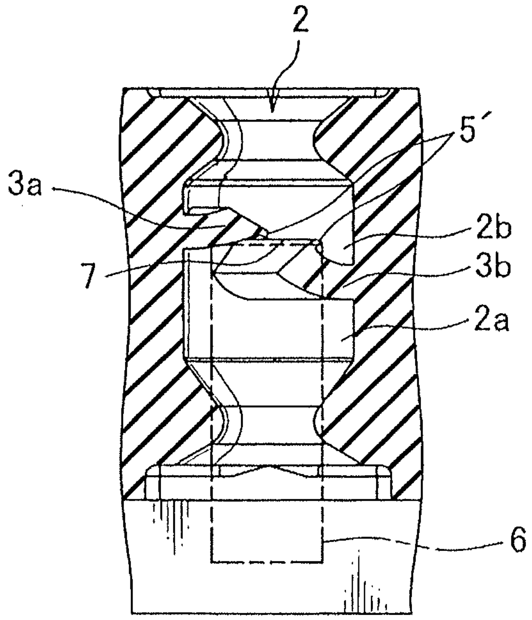
FIG. 13B is a vertical cross-sectional view showing that the membrane is broken.

As the terminal 6 is inserted into the terminal insertion bore 2, corners 6*c*, 6*c* of the terminal 6 hit end portions 5*d*, 5*d* of the lamella 5' as shown in FIG. 13A. The terminal 6 firstly breaks the end portions 5*d*, 5*d* of the lamella 5' as shown in FIG. 13B, and further smoothly breaks the membrane 5'.

When the terminal 6 is incorrectly inserted and removed from the terminal insertion bore 2, the bore 7 is formed in the terminal insertion bore 2. The insertion bore 7 deforms in a similar manner (FIG. 4) as the first embodiment when the insertion bore 7 is subjected to the compression force. The air-leak test can thus easily detect the presence of the bore. Smooth breaking of the lamella 5' also assists regular insertion of the terminal 6.

Referring to FIG. 12A, the terminal insertion bores 2 have the same arrangement of the upper and the lower membrane portion 3*a*, 3*b* along the X direction but a reverse arrangement with respect to the adjacent terminal insertion bores 2. However, the lamellas 5' are oriented to the same direction with respect to the connector seal main body 9. Each lamella 5' is flush with a step portion 4 of the upper membrane portion 3*a* and a step portion 4 of the lower membrane portion 3*b*, and is oriented to the diagonal line 42 of the terminal 6.

A side surface 6*b* of the terminal 6, a side surface 9*a* of the seal main body 9, and side surfaces 12*a*, 13*a* of an upper and a lower opening 12, 13 are parallel to one another. The side surface 6*b* of the terminal 6 is also parallel to a side surface of the connector housing attached with the connector seal 1'. The terminal insertion bores 2 have a circular cross-section.

The terminal 6 of FIGS. 13A-B is the female type and has a common configuration such as an electrical contact portion and an electrical wire connection portion (both not shown). The diagonal line 42 of the terminal 6 is related to the distal end of the electrical contact portion. The connector housing (not shown) includes the terminal receiving chambers for receiving the terminals 6 through the terminal insertion bores 2.

The terminal 6 has the diagonal line 42 inclined by at least 30 degrees (angle of inclination α) against the side surface 6*b* of the terminal 6 and the lamella 5' is also inclined by the same degree against the side surface 6*b*. The length of the lamella 5' is substantially same as that of the diagonal line 42 of the distal end surface of the terminal 6.

The connector seal 1' also includes a lip 10*a* disposed around the seal main body 9 and a small diameter lip 11 disposed in the terminal insertion bore 2. The membrane 3 includes the upper and the lower membrane portion 3*a*, 3*b* and the lamella 5'.

The lamella 5' is broken at both end portions 5*d*, 5*d* with insertion of the terminal 6 and is further broken with a relatively small force. When the terminal 6 is incorrectly inserted into and removed from the terminal insertion bore 2, the bore 7 is formed between the upper and the lower membrane portion 3*a* and 3*b*. When the bore 7 is subjected to the compression force in the radial direction, the bore 7 forms the cavity to communicate between an upper chamber 2*a* and a lower chamber 2*b* of the terminal insertion bore 2 so that the air-leak test can assuredly detect the presence of the bore 7.

When the terminal 6 has a square cross-section, the angle of inclination α is set as 45 degrees. The angle of the lamella 5' against the seal main body 9 is designed to correspond with the angle of the diagonal line 42.

When the terminal 6 is a thin male type and has a rectangular cross-section of the electrical contact portion, the lamella 5' is designed to be oriented to the diagonal line 42 of the cross-section of the electrical contact portion. The angle of inclination α becomes at most 30 degrees.

Figure 14A:
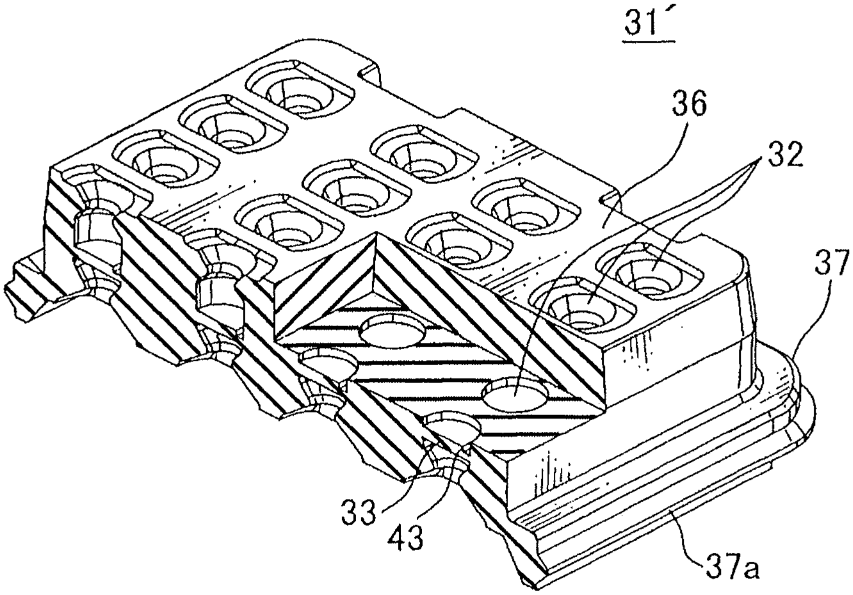
FIG. 14A is a perspective view of a fifth embodiment of the connector seal of the present invention.
Figure 14B:
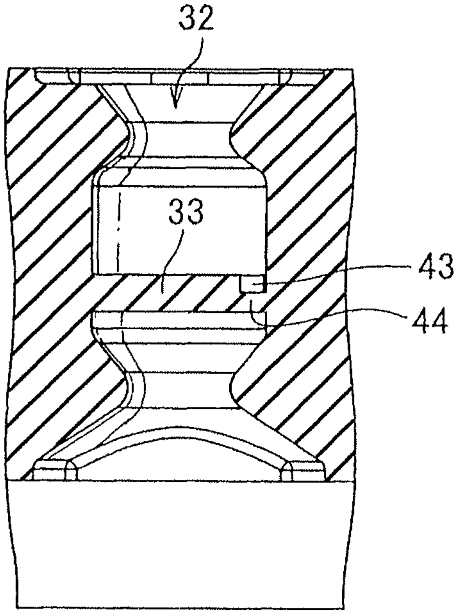
FIG. 14B is a vertical cross-sectional view of an essential portion of the fifth embodiment.
Figure 14C:
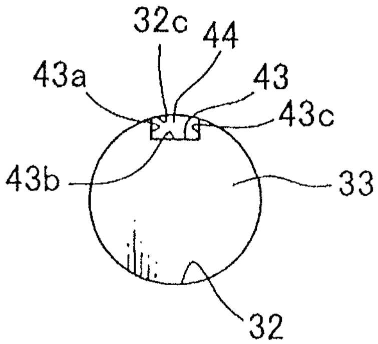
FIG. 14C is a plan view of the essential portion of the fifth embodiment.
Figure 15:
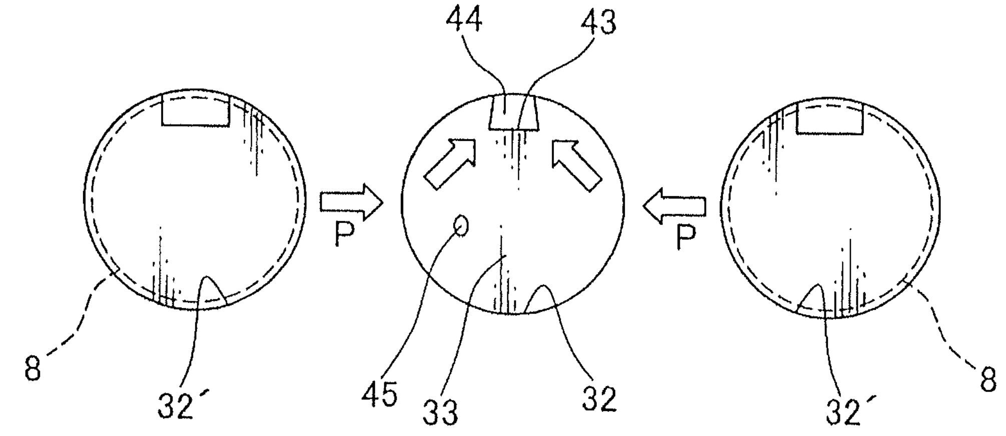
FIG. 15 is a vertical cross-sectional view showing that an incorrectly-inserted terminal insertion bore is subjected to a compression force from an adjacent terminal insertion bore receiving an electrical wire connected to a terminal.
Figure 16A:
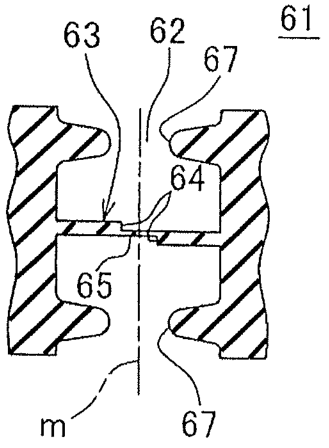
FIG. 16A PRIOR ART
FIG. 16A is a vertical cross-sectional view of a conventional connector seal.
Figure 16B:
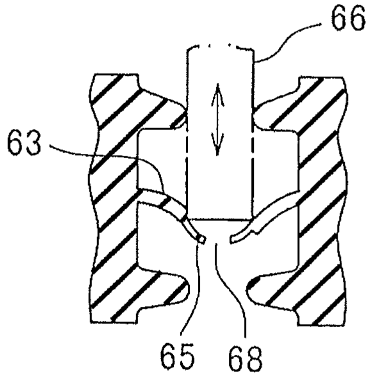
FIG. 16B PRIOR ART
FIG. 16B is a vertical cross-sectional view showing that a membrane is broken.

FIGS. 14-15 show a fifth embodiment of the connector seal of the present invention. The connector seal has a structure similar to the connector seal of FIG. 10 (the third embodiment). Like parts have the same reference signs.

Referring to FIG. 14A, a connector seal 31' includes a seal main body 36 and a plurality of terminal insertion bores 32. The terminal insertion bores 32 each have a horizontal membrane 33 in a radial direction thereof. The membrane 33 has a rectangular groove 43 at a portion of an outer circumference of the membrane 33. As shown in FIG. 14B, a lamella 44 is defined between a bottom surface of the groove 43 and a lower surface of the membrane 33.

The center angle of the groove 43 of FIG. 14C is about 45 degrees compared to the center angle (90 degrees) of the groove 34 of FIG. 10. The rectangular groove 43 is defined with three segments 43*a*-43*c* and an inner surface 32*c* of the terminal insertion bore 32.

When the terminal 6 is incorrectly inserted and removed from the terminal insertion bore 32, a bore 45 is formed in the membrane 33 (FIG. 15). When the adjacent terminal insertion bores 32', 32' each receive an electrical wire 8 connected to a terminal 6, the membrane 33 is subjected to a compression force P from the adjacent terminal insertion bores 32', 32'. When the bore 45 is subjected to the compression force P, the bore 45 often collapses and escapes detection of presence of the bore with the air-leak test when a conventional membrane is utilized. Referring to FIG. 15, when the membrane 33 is subjected to the compression forces P, P from the adjacent terminal insertion bores 32', 32', the groove 43 absorbs the compression forces P, P in a direction indicated by arrows P', P' with deformation of itself so as to keep the bore 45 open. The air-leak test thus assuredly detects the presence of the bore 45. The direction of the compression forces P', P' enlarges the bore 45 compared to the original bore 45.

It is appreciated that the groove 43 can have a circular shape wider than that of FIG. 10, a triangle shape so long as the groove 43 absorbs the compression force. It is apparent that two, three or four of the grooves 43 can be disposed equally spaced around the membrane 33.

It is necessary that the groove 43 faces the inner surface 32*c* of the terminal insertion bore 32 so that the portion of the inner surface 32*c* deforms the groove 43 when the membrane 33 is subjected to the compression force. It is not recommended to dispose the groove 43 at the center of the membrane 33. When the membrane 33 is subjected to the compression force from the adjacent terminal insertion bores 32, the bore 45 may collapse due to the compression force of the membrane 44.

The groove 43 is designed to keep the groove 43 remain when the membrane 33 can be broken at any portion so that the leak test can detect the presence of the bore 45 under the compression force.

It is possible to position the lamella 44 coincident with a corner 6*c* (FIG. 13A) of the terminal 6. It is apparent that the groove 43 can be anywhere positioned with respect to the corner 6*c* of the terminal 5. When the position of the lamella 44 is not coincident with that of the corner 6*c*, the groove 43 only affects absorption of the compression force. It is apparent that the groove 44 can absorb the compression force from opposite end portions or one end portion of the membrane 33.

The connector seal of the present invention provides the reliable inspection of the bore. A shipment of the connector seal having the bore and the connector attached therewith can be prevented.

What is claimed is:

1. A connector seal comprising:

a seal main body; and a plurality of terminal insertion bores disposed on the seal main body, wherein the terminal insertion bores each include a membrane therein, the membrane having an upper membrane portion and a lower membrane portion spaced a distance along an insertion direction of a terminal, the upper and the lower membrane portions having terminal end portions thereof, which overlap one another in the insertion direction, the overlapping portions being interconnected with a lamella extending along a step portion of each of the respective membrane portions in the insertion direction, wherein a height of the lamella in the insertion direction is greater than a thickness of the lamella and both an upper and lower surface of both the upper and lower membrane portions extend perpendicularly from a wall of each of the terminal insertion bores to form a rectangular shaped upper membrane portion cross section and a rectangular shaped lower membrane portion cross section, wherein the height of the lamella extends from a lower edge of the upper membrane portion to an upper edge of the lower membrane portion, wherein the terminal insertion bores are arranged in in rows and columns in respective X-Y directions on the main seal body with the terminal insertion bores in each of the rows being equally spaced and the terminal insertion bores in each of the columns being equally spaced, and with the spacing between the adjacent terminal insertion bores in each of the rows being smaller than the spacing between adjacent terminal insertion bores in each of the columns, and wherein the upper and the lower membrane portions of adjacent terminal insertion bores in the Y direction project into their respective bores in opposite directions along the Y direction and the respective upper or lower membrane of adjacent bores in the Y direction are at a same height in the terminal insertion direction.

2. The connector seal of claim 1, wherein the membrane defines a pair of chambers disposed on opposite sides of the membrane in the insertion direction and wherein at least one of the chambers includes a pair of lips on an inner surface of each of the terminal insertion bores.

* * * * *